(12) United States Patent
Correira

(10) Patent No.: US 6,916,124 B1
(45) Date of Patent: Jul. 12, 2005

(54) TRACK SYSTEM FOR BODY-MOUNTED CAMERA SUPPORT APPARATUS

(76) Inventor: John Correira, The Bates Bldg., Ste. 219A, 7 N. Main St., Attleboro, MA (US) 02703

( * ) Notice: Subject to any disclaimer, the term of this patent is extended or adjusted under 35 U.S.C. 154(b) by 0 days.

(21) Appl. No.: 10/807,633

(22) Filed: Mar. 24, 2004

Related U.S. Application Data

(60) Provisional application No. 60/467,930, filed on May 6, 2003.

(51) Int. Cl.[7] .............................................. G03B 17/00
(52) U.S. Cl. ...................................... 396/421; 396/428
(58) Field of Search ................................ 396/419, 420, 396/421, 428; 352/243

(56) References Cited

U.S. PATENT DOCUMENTS

| | | | | |
|---|---|---|---|---|
| 4,017,168 A | * | 4/1977 | Brown | ........................ 352/243 |
| 4,156,512 A | * | 5/1979 | Brown | ........................ 248/586 |
| 4,158,490 A | * | 6/1979 | Gottschalk et al. | ......... 352/243 |
| 4,208,028 A | * | 6/1980 | Brown et al. | ................ 224/185 |
| 4,394,075 A | * | 7/1983 | Brown et al. | ................ 352/243 |
| 5,829,652 A | * | 11/1998 | Denzer et al. | .............. 224/270 |

\* cited by examiner

Primary Examiner—David M. Gray

(57) ABSTRACT

The present invention is directed to a track system for a body-mounted camera support apparatus. The track system consists of parallel tracks with integrated mounting hardware for connecting the tracks to a camera support vest. The tracks are mounted in existing mounting locations reserved for a socket block and associated socket block supporting member found on commercially available support vests. The track can extend straight, semi-circular or in a combination of angular configurations around the operator. A sliding channel member is also provided adapted to receive and move along the parallel tracks. The sliding channel member may include friction reducing materials for prevention of seizing between the sliding member and parallel tracks. The sliding channel member further includes a socket block formed thereon for engagement of the camera support arm. The support arm will now have the ability to pivot and slide along the parallel tracks thereby providing the operator a new range of horizontal adjustability.

20 Claims, 8 Drawing Sheets

TRACK SYSTEM FOR BODY-MOUNTED CAMERA SUPPORT APPARATUS

CROSS-REFERENCE TO RELATED APPLICATIONS

This application claims the benefit of U.S. Provisional Application No. 60/467,930, filed May 6, 2003.

FIELD OF THE INVENTION

This invention relates to equipment supports and more particularly pertains to a camera support harness worn by a cameraman, which allows for increased mobility of camera equipments mounted thereto.

BACKGROUND OF THE INVENTION

In the mid-1970's, mounting systems were developed for motion picture cameras which were used to mount the camera on the body of the operator. These systems were designed to very substantially isolate the motion of the supporting body from the camera. At the same time, the systems provided suspending support for the camera. The supported camera was capable of being lightly guided by the hand of the operator who could move horizontally in all directions either relative to his body or with his body as he moved about. The camera could also be raised or lowered with a relatively light touch. A number of patents have issued on these early systems. They include U.S. Pat. Nos. 4,017,168; 4,156,512; 4,208,028; and 4,394,075. The disclosures of which are incorporated herein by reference.

The prior art reflects camera-supporting means, which are subdivided into three or more sub-assemblies which are remotely located from each other and which are constructed and arranged about a handle in a balanced arrangement. Preferably, the handle is located near or close to the center of the moment of inertia of the mass of the camera. The camera is supported by a pair of longitudinally juxtaposed, spring-loaded parallelogram, support arms. One end of the support arms is affixed to a support harness in a pivotal connection and the harness is worn by the cameraman in a manner to carry the camera weight without using his hands or arms. The other end of the support arm carries a gimbal yoke in a pivotal manner to permit relatively free floating of the camera and accessory equipment. The prior art discloses the pivotal connection of the support arm to the support harness as being at a fixed location on the harness. This would allow for the support arm to pivot about a fixed location relative to the operator and would limit the range of horizontal motion of the support arm relative to the operator.

OBJECTS AND SUMMARY OF THE INVENTION

The present invention is directed to a track system for a body-mounted camera support apparatus. The track system may be adapted to fit on commercially available camera support vests such as those produced by the Tiffen Company, LLC. The track system consists of parallel tracks with integrated mounting hardware for connecting the tracks to a camera support vest. The tracks are mounted in existing mounting locations reserved for a socket block and associated socket block supporting member found on commercially available support vests. The track can extend straight, semi-circular or in a combination of angular configurations around the operator. A sliding channel member is also provided adapted to receive and move along the parallel tracks. The sliding channel member may include friction reducing materials for prevention of seizing between the sliding member and parallel tracks. The sliding channel member further includes a socket block formed thereon for engagement of the camera support arm. The support arm will now have the ability to pivot and slide along the parallel tracks thereby providing the operator a new range of horizontal adjustability.

DESCRIPTION OF THE PREFERRED EMBODIMENTS

Figure 1:
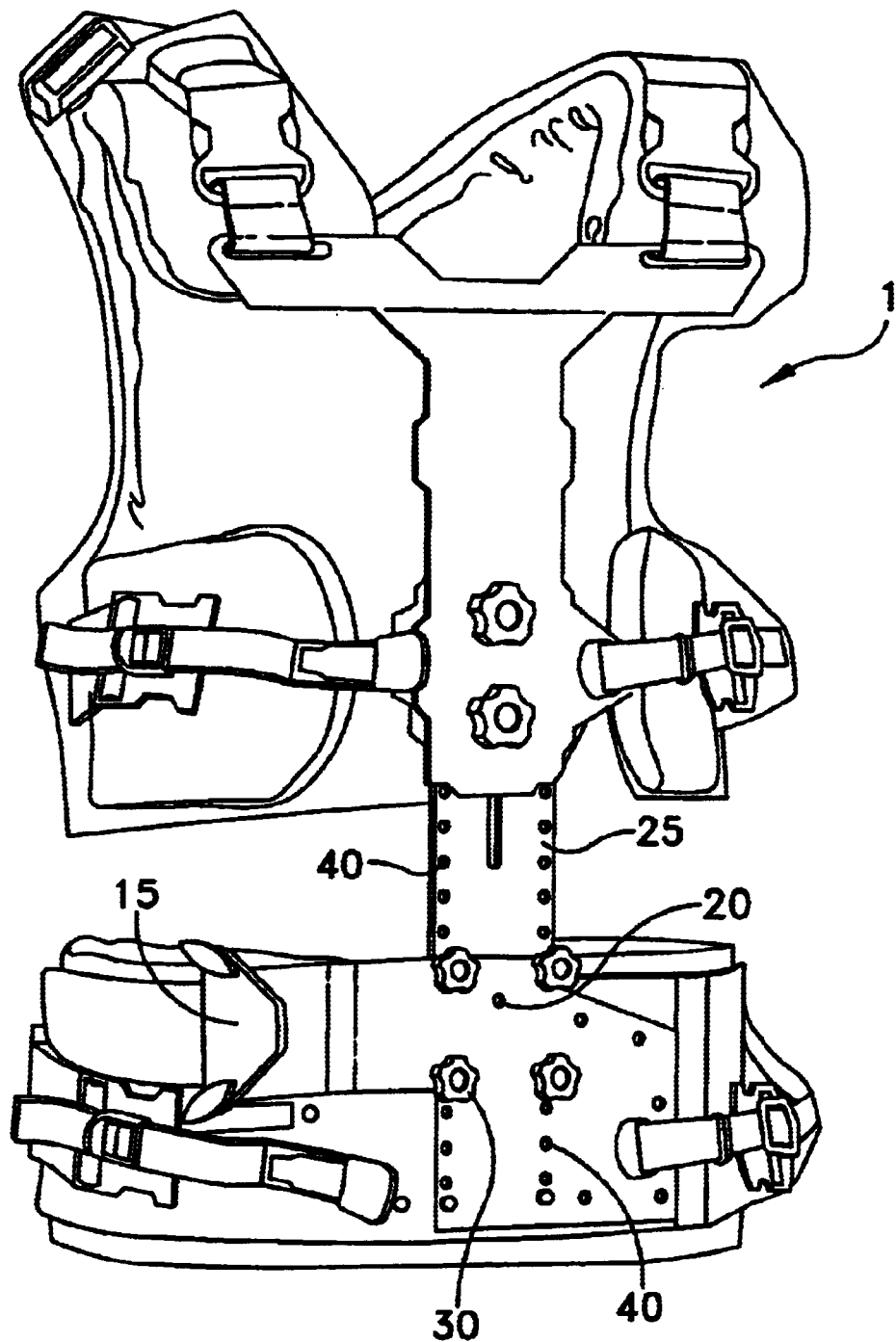
FIG. 1 illustrates a prior art camera support vest.
Figure 2:
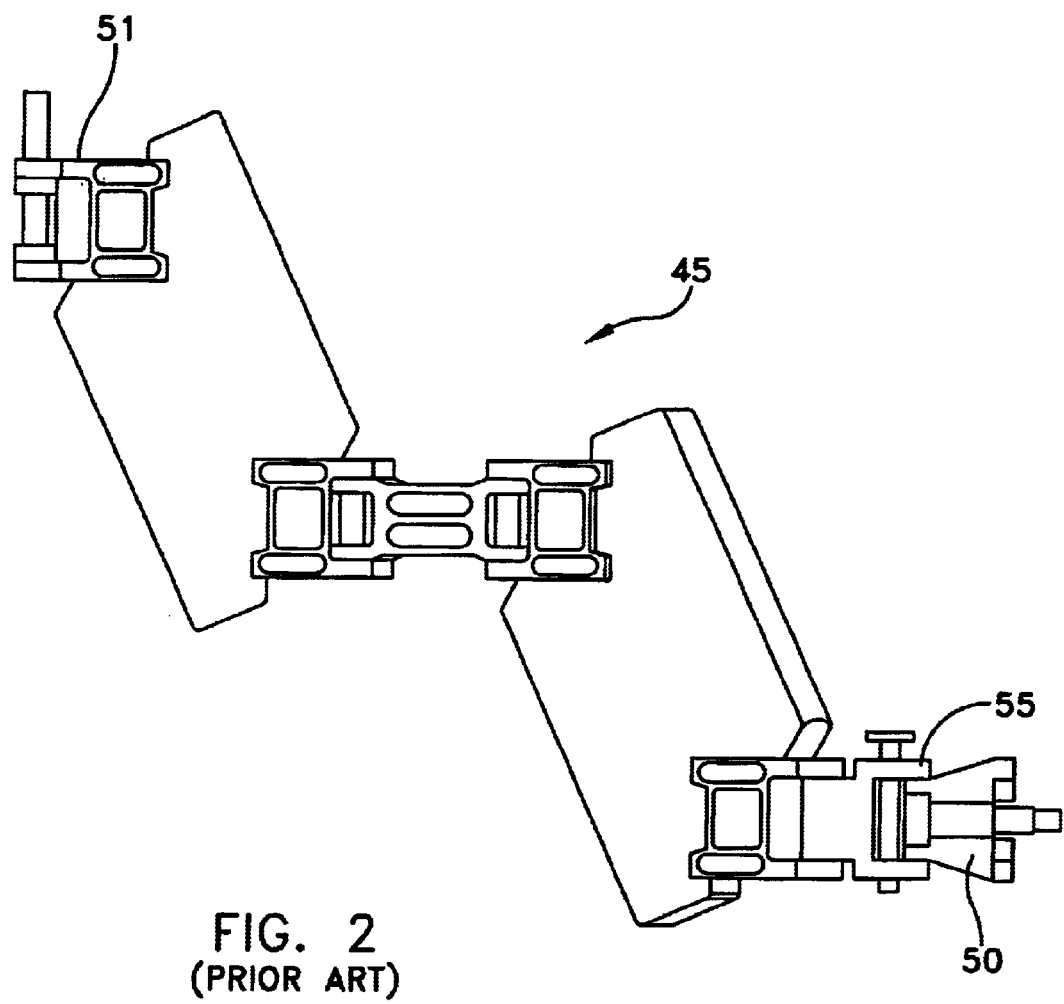
FIG. 2 illustrates prior art camera support arms.
Figure 3:
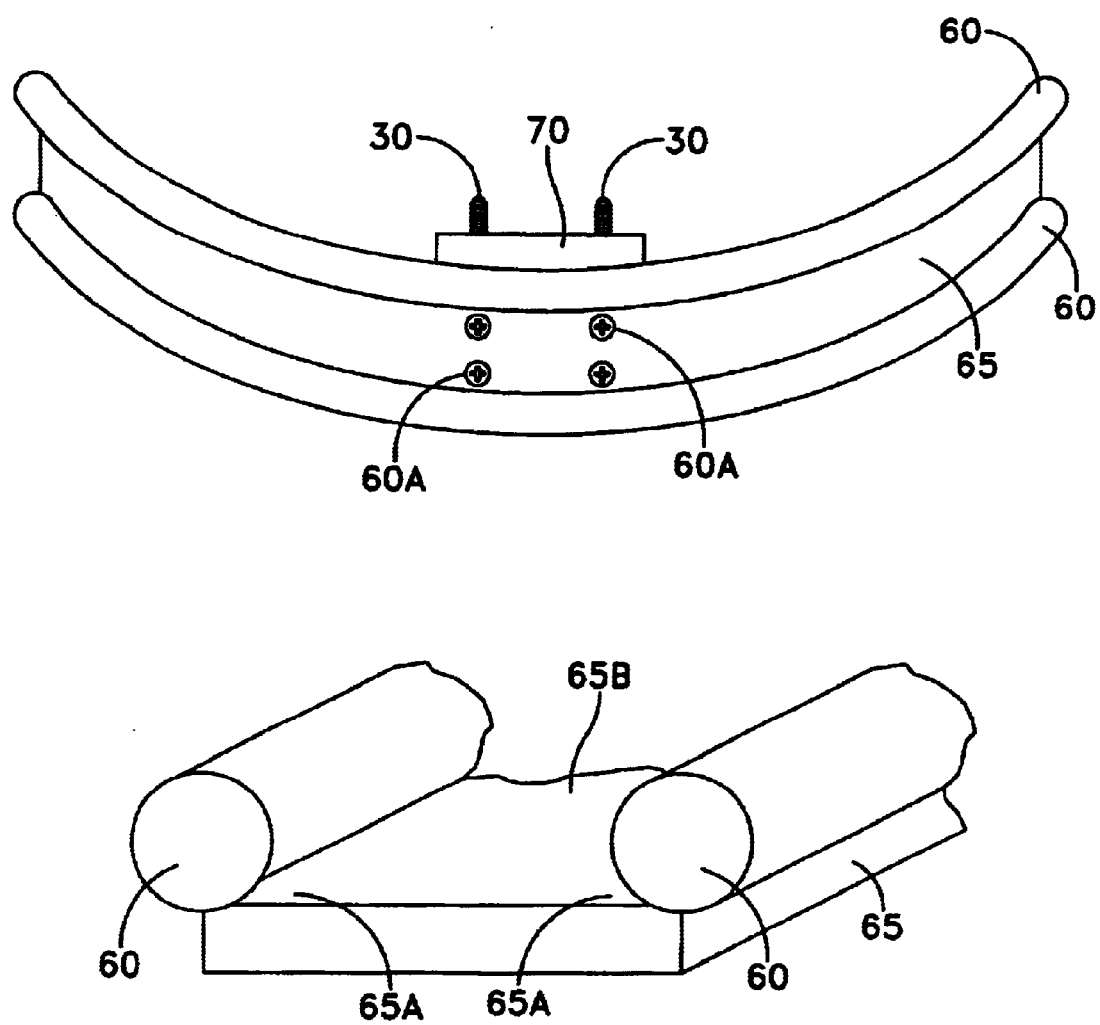
FIG. 3 illustrates a tubular track embodiment of the present invention.
Figure 6:
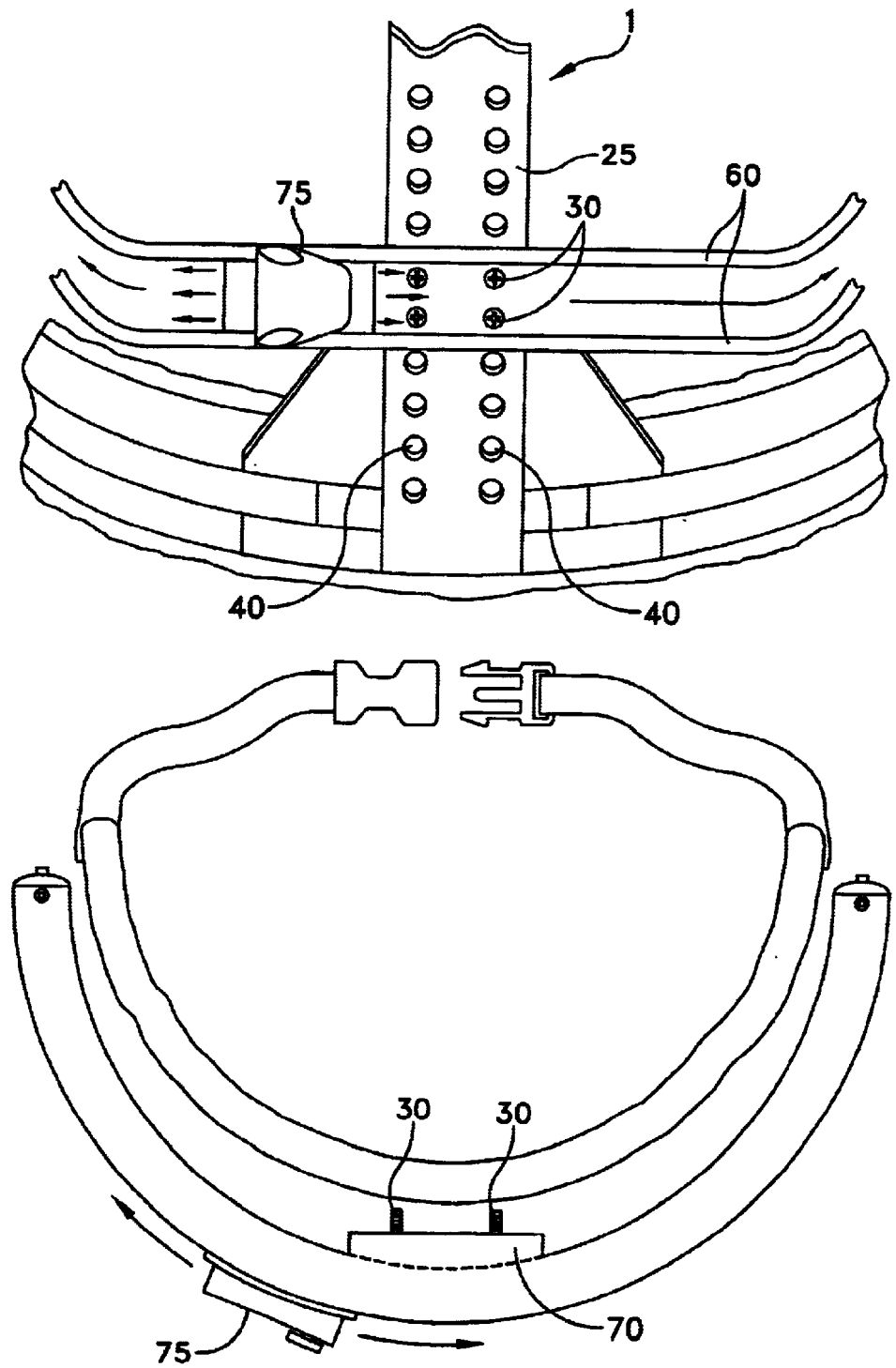
FIG. 6 illustrates an embodiment of the present invention affixed to a prior art camera support vest.
Figure 7:
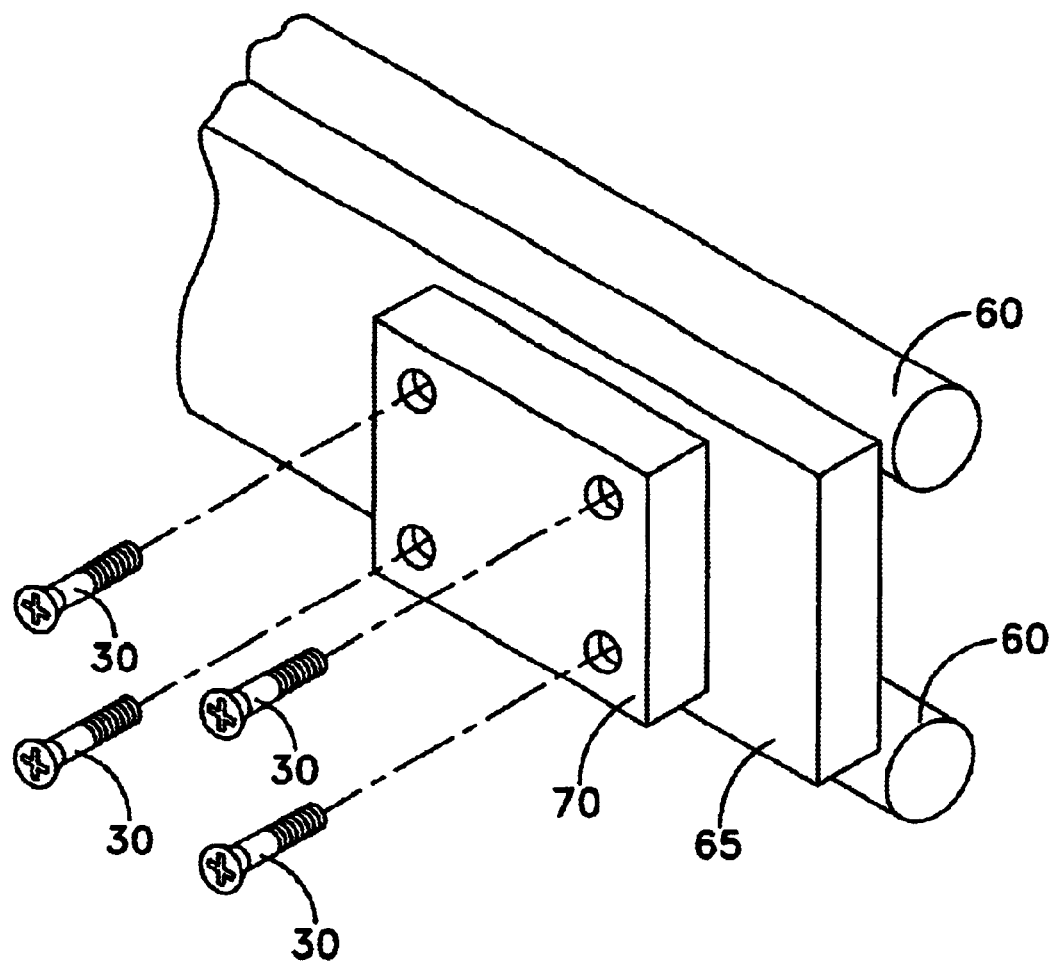
FIG. 7 illustrates a mounting plate of subject invention affixed to the rear of the tubular track system.

Referring to FIG. 1, a prior art camera support vest is disclosed which can utilize the track system of subject invention. The vest 1 includes a socket block 15 affixed to an adjustable plate 20. Plate 20 is adjustable in the vertical direction along support brace 25 and secured thereto by set screws 30 into variable adjustment settings 40. FIG. 2 illustrates a prior art camera support arm 45 including a socket block mounting end 50 which engages socket block 15 to secure arm 45 to vest 1 and allows for arm 45 to rotate relative to a cameraman at connector hinge 55. Subject invention requires the removal of socket block 15 and adjustable plate 20 by unscrewing set screws 30. Referring to FIG. 3, parallel tubular tracks 60 are constructed of high-grade aluminum or metal and are affixed by welding or other suitable means to the lengthwise top ends 65A of rectangular plate 65. The tubular tracks 60 are affixed to plate 65 in a fixed parallel relation to each other. Recesses may be added to the edges of top ends 65A of plate 65 to better position tubular tracks 60 at lengthwise top ends 65A. The preferred embodiment discloses semi-circular extending tubular tracks 60, however, the tubular tracks 60 may extend semi-circular, straight, or a combination of angular configurations. Furthermore, tracks 60 could be other than tubular dimension, such as square, rectangular, etc. Referring to FIG. 7, a mounting plate 70, for adequately securing plate 65, and affixed tubular tracks 60 to the support brace 25 (FIG. 1, FIG. 6) is provided. The mounting plate 70 is secured to plate 65 (FIG. 1, FIG. 6) with set screws 30 as illustrated in FIG. 3 and FIG. 6. The mounting plate 70 is permanently affixed to plate 65 by welding or other available means known in the art. As illustrated in FIG. 3, the set screws 30 are recessed 60A within the channel 65B formed by tubular tracks 60 and plate 65.

Figure 4:
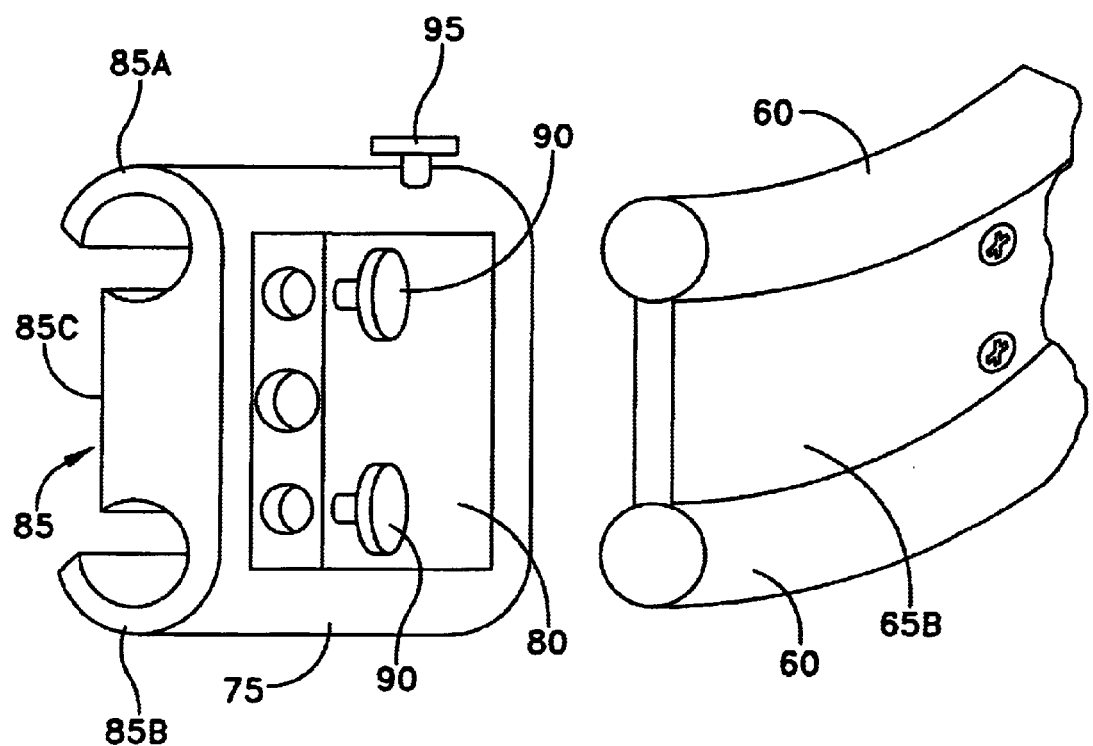
FIG. 4 illustrates the improved socket block of the present invention.
Figure 5:
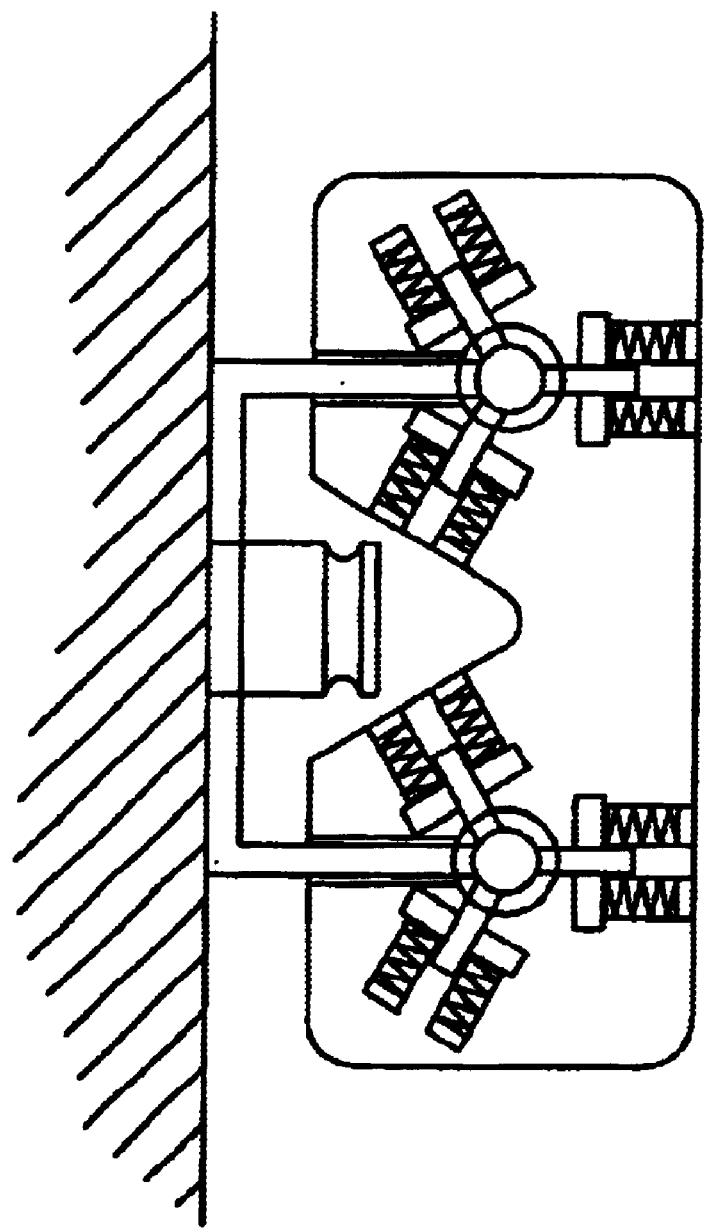
FIG. 5 illustrates an embodiment of the tubular track system utilizing friction brakes.
Figure 8:
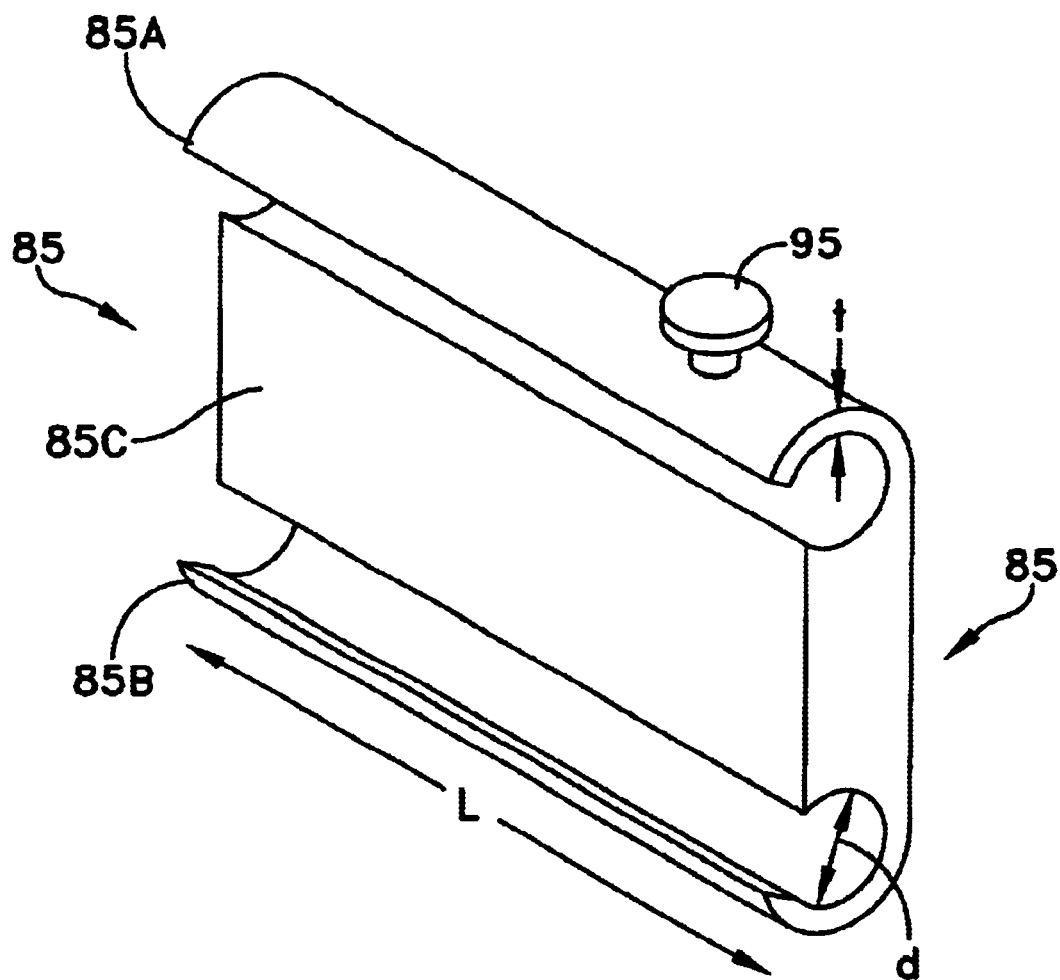
FIG. 8 illustrates the recessed guiding member of the improved socket block of subject invention.

The plate 70 and set screws 30 are of sufficient thickness and dimension to support the weight of a support arm and associated camera equipment that engage tubular tracks 60 as described below. Referring to FIG. 4, an improved socket block 75 is disclosed which includes a prior art socket block or equivalent 80 which is mounted or formed by means such as injection molding, welding, or other means known in the art on sliding channel member 85. Channel member 85 is adapted to engage and move relative to parallel tubular tracks 60 along the entire length of tracks 60. Socket block 80, known in the art, is adapted to receive and lock in place socket block mounting end 50 of support arm 45 (FIG. 2) with locking clamps 90 or other available locking means known in the art. It is understood that alternative forms of socket block 80, known in the art, to receive and lock in place socket block mounting end 50 may be utilized in subject invention. Sliding channel member 85 includes arc shaped receiving ends 85A and 85D which encase and are in sliding engagement with tracks 60 along the length of tubular tracks 60. Alternatively, sliding channel member 85 may include square, rectangular, etc. dimensioned receiving ends 85A and 85B where alternative dimensioned tracks 60 (ie square, rectangular, etc) are utilized. Referring to FIG. 8, channel member 85 further includes a recessed guiding member 85C formed between and extending the length of receiving ends 85A and 85B. The surface of guiding member 85C is in contact with and in sliding engagement along the surface of channel 65B formed by tubular tracks 60 and plate 65. Guiding member 85C is in contact with channel 65B to provide increased support while socket block 75 is under load by supporting arm 45 and associated camera equipment mounted thereon. The diameter d, thickness t, and length 1, of receiving ends 85A and 85B allow for a secure engagement of tubes 60 within receiving ends 85A and 85B and ensure stable support of arm 45 and associated camera equipment mounted thereon. Furthermore, the diameter of receiving ends 85A and 85B allow for slidable adjustment of socket block 75 along tubular tracks 60 under the load of supporting arm 45 and associated camera equipment mounted thereon. The thickness and strength of the aluminum or metal utilized in subject invention will be that required to support the prior art arm and associated camera equipment mounted thereon. If required, a teflon or equivalent material may be affixed to the exterior of tubular tracks 60 or the interior of receiving ends 85A or 85B to prevent seizing, such a material described in U.S. Pat. No. 2,886,095 herein incorporated by reference. It is also within the scope of subject invention to employ other suitable methods of reducing friction between tubular tracks 60 and receiving ends 85A and 85B, such as various ball bearing assemblies, as described in U.S. Pat. No. 6,036,253, 5,855,350, and 4,863,289 the disclosures of which are incorporated by reference. Tubular tracks 60 may include recessions, which are engaged by a locking member 95. Locking member 95 can be utilized to lock sliding channel member in place at a desired point along tubular tracks 60. FIG. 5 illustrates a spring loaded friction brake mechanism that could also be used to secure sliding channel member 85 at a desired point along tubular tracks 60.

While a number of preferred embodiments of the invention have been disclosed in detail, those of skill in the art will recognize that a number of additional embodiments thereof and improvements thereon are within the scope of the invention. For example, track means could include a single piece construction versus parallel extensions affixed to a rectangular plate. The integrated construction could include a single rail member with extensions or lips for engagement of a sliding channel member. Other variations of track means that would allow a support arm rotation about an operator are also contemplated.

I claim:

1. A track system attached to a body connecting vest, the system for use with a weight support apparatus adapted to support a piece of equipment to give it improved stability against undesirable motion of the body to which the weight support apparatus is connected, the weight support apparatus having a support arm with a first and second ends, the first end adapted to connect to the piece of equipment, the second end including a mounting end for engaging the track system, the track system comprising:

track means extending outward from said vest and around the operator, said track means engaging said mounting end of said support arm of said weight support apparatus, said track means allowing for said mounting end of said support arm to slideably rotate along said track means in moving relation to said operator.

2. The track system of claim 1, wherein said track means comprises:

parallel rigid extensions; and a rectangular plate, said rigid extensions affixed to the ends of said plate, said plate securing said rigid extensions in a fixed position.

3. The track system of claim 2 wherein said parallel rigid extensions are selected from the group consisting of tubular, rectangular and square.

4. The track system of claim 2 wherein said rectangular plate comprises mounting means, said mounting means for attachment of said track means to said body connecting vest.

5. The track system of claim 1, wherein said outward extending track means are semi-circular.

6. The track system of claim 2, wherein said track means further comprises a sliding channel member adapted to engage and move relative to said parallel rigid extensions, along the entire length of said extensions, said sliding channel member further including support arm locking means adapted to engage said mounting end of said support arm, said sliding channel member supporting the weight of said support arm while allowing said support arm to slideably rotate along said parallel rigid extensions in moving relation to said operator.

7. The track system of claim 6, wherein said sliding channel member further includes shaped receiving ends, said shaped receiving ends encasing said parallel rigid extensions, said shaped receiving ends in sliding engagement along the length of said parallel rigid extensions.

8. The track system of claim 7 wherein said parallel rigid extensions further include grooves thereon.

9. The track system of claim 8, wherein said shaped receiving ends further include locking means, said locking means engaging said grooves of said parallel rigid extensions, to lock said sliding channel member in place.

10. The track system of claim 7, wherein said shaped receiving ends are arc shaped.

11. The track system of claim 7, wherein said sliding channel member further includes a guiding member, said guiding member formed between said shaped receiving ends, said guiding member in contact with and in sliding engagement along the surface of said rectangular plate.

12. The track system of claim 11 wherein said guiding member is recessed.

13. A weight support apparatus system especially adapted for operation as a portable device on a moving operator, and capable of being guided by the arm of the operator, comprising:

weight support means comprising first and second ends, said weight support means further including a vest worn by the operator, the first end being connected to and adapted to support at least part of the weight, said vest including track means extending outward from said vest and around said operator, said track means engaging said second end of said support arm of said weight support apparatus, said track means allowing for said second end of said support arm to slideably rotate along said track means in moving relation to said operator, said weight support means comprising at least a pair of first and second interconnected support arms, said support arms being adapted to damp out vibrations due to movement of the operator.

14. The weight support apparatus of claim 13, wherein said track means comprises:

parallel rigid extensions; and a rectangular plate, said rigid extensions affixed to the ends of said plate, said plate securing said rigid extensions in a fixed position.

15. The weight support apparatus of claim 14 wherein said parallel rigid extensions are selected from the group consisting of tubular, rectangular and square.

16. The weight support apparatus of claim 14 wherein said rectangular plate comprises mounting means, said mounting means for attachment of said track means to said body connecting vest.

17. The weight support apparatus of claim 13, wherein said outward extending track means are semi-circular.

18. The weight support apparatus of claim 14, wherein said track means further comprises a sliding channel member adapted to engage and move relative to said parallel rigid extensions, along the entire length of said extensions, said sliding channel member further including support arm locking means adapted to engage said mounting end of said support arm, said sliding channel member supporting the weight of said support arm while allowing said support arm to slideably rotate along said parallel rigid extensions in moving relation to said operator.

19. The weight support apparatus of claim 18, wherein said sliding channel member further includes shaped receiving ends, said shaped receiving ends encasing said parallel rigid extensions, said shaped receiving ends in sliding engagement along the length of said parallel rigid extensions.

20. The weight support apparatus of claim 19, wherein said sliding channel member further includes a guiding member, said guiding member formed between said shaped receiving ends, said guiding member in contact with and in sliding engagement along the surface of said rectangular plate.

* * * * *